(12) United States Patent
Liao

(10) Patent No.: US 8,934,233 B2
(45) Date of Patent: Jan. 13, 2015

(54) ELECTRONIC DEVICE AND EJECTION MECHANISM THEREOF

(75) Inventor: Chien-Jung Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 294 days.

(21) Appl. No.: 13/489,587

(22) Filed: Jun. 6, 2012

(65) Prior Publication Data

US 2012/0314378 A1 Dec. 13, 2012

(30) Foreign Application Priority Data

Jun. 8, 2011 (TW) .............................. 100119967 A

(51) Int. Cl.
| | |
|---|---|
| H05K 7/10 | (2006.01) |
| G06F 1/16 | (2006.01) |
| G06K 13/08 | (2006.01) |
| H01Q 1/22 | (2006.01) |
| H01Q 1/08 | (2006.01) |

(52) U.S. Cl.
CPC .......... G06F 1/1698 (2013.01); G06K 13/0818 (2013.01); G06K 13/0831 (2013.01); H01Q 1/2266 (2013.01); H01Q 1/088 (2013.01)
USPC .............. 361/679.32; 361/679.31; 361/679.5; 439/152; 455/558

(58) Field of Classification Search
CPC ............................ H04B 1/3816; G06F 1/1658
USPC .................................................... 361/679.32
See application file for complete search history.

(56) References Cited

U.S. PATENT DOCUMENTS

| | | | | |
|---|---|---|---|---|
| 5,695,351 | A * | 12/1997 | Kimura et al. ................ | 439/159 |
| 6,018,669 | A * | 1/2000 | Stoegmueller ............... | 455/558 |
| 7,505,682 | B2 | 3/2009 | Liu | |
| 8,172,282 | B2 * | 5/2012 | Lev et al. ...................... | 292/164 |
| 8,371,878 | B2 * | 2/2013 | Tang .............................. | 439/630 |
| 2010/0073891 | A1 * | 3/2010 | Chen et al. .................... | 361/759 |
| 2012/0044654 | A1 * | 2/2012 | Hsiu et al. ..................... | 361/747 |
| 2012/0152054 | A1 * | 6/2012 | Peng .............................. | 74/527 |

FOREIGN PATENT DOCUMENTS

| | | |
|---|---|---|
| TW | 573913 | 1/2004 |
| TW | M339895 | 9/2008 |
| TW | M347615 | 12/2008 |

OTHER PUBLICATIONS

Taiwan Patent and Trademark Office, Office Action and English Translation for Taiwanese Counterpart Application No. KR100119967, and Cited Reference TW200820047 and English Translation.
The Office Action issued to Chinese Counterpart Application No. 201110172551.2 by the State intellectual Property Office of the P.R.C. on Aug. 27, 2014: along with an Eilgiish translation of the boxed sections.

* cited by examiner

*Primary Examiner* — Anthony Q Edwards
(74) *Attorney, Agent, or Firm* — Shook Hardy & Bacon LLP

(57) ABSTRACT

An electronic device comprises a casing, an electronic element, and an ejection mechanism. The casing has a receiving space and an opening. The ejection mechanism includes: a holder for holding and carrying the electronic element to pass through the opening to be exposed outside the casing; a first biasing spring biasing the holder to project outwardly from the opening; a stopping member rotatably pivoted to the casing and contactable with a projection of the holder; a second biasing spring biasing the stopping member to contact the projection, and having an elastic modulus greater than that of the first biasing spring; and a releasing member operable for driving the stopping member to detach from the projection.

15 Claims, 15 Drawing Sheets

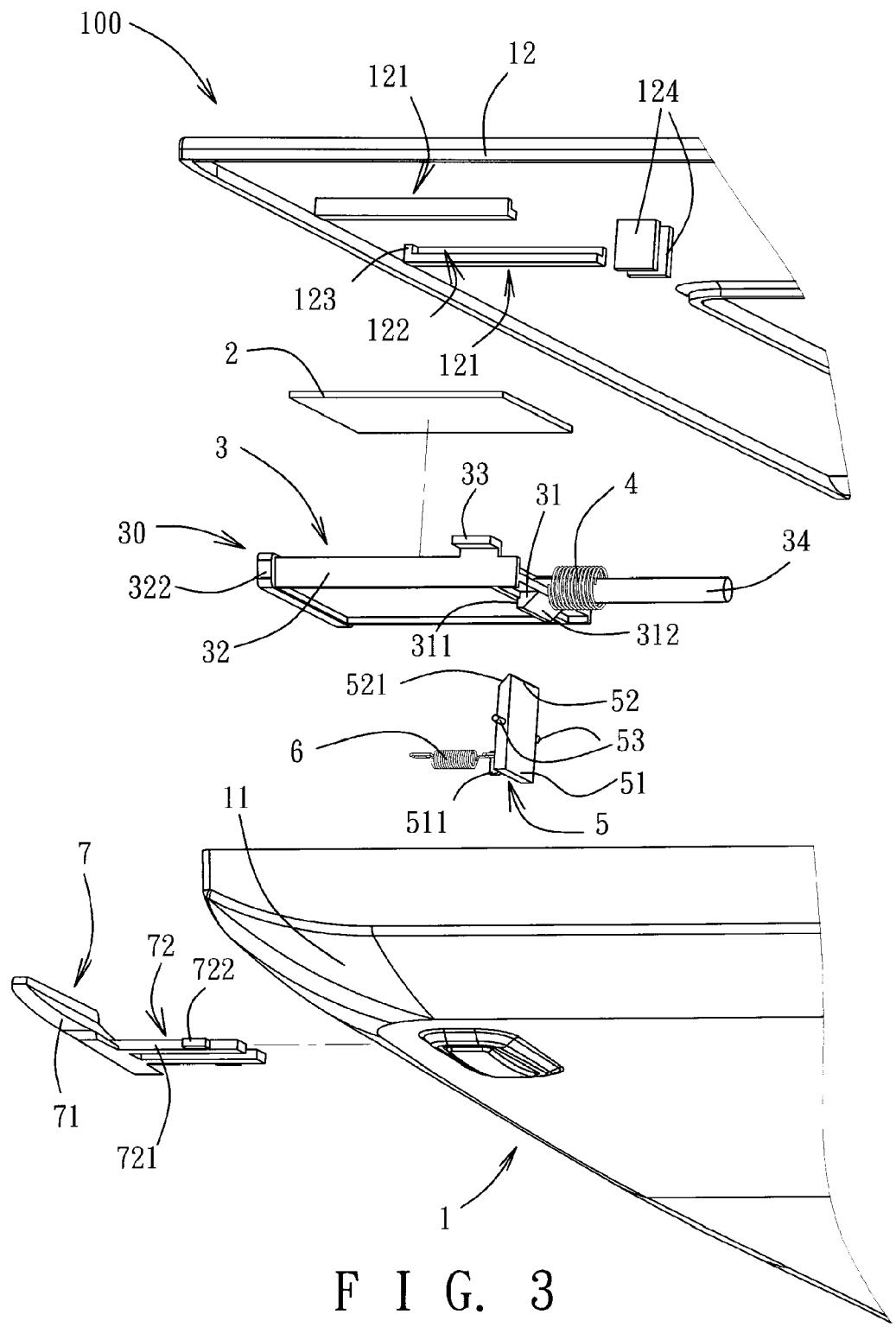
F I G. 3

ELECTRONIC DEVICE AND EJECTION MECHANISM THEREOF

CROSS-REFERENCE TO RELATED APPLICATION

This application claims priority of Taiwanese Patent Application No. 100119967, filed on Jun. 8, 2011, the disclosure of which is incorporated herein by reference.

BACKGROUND OF THE INVENTION

1. Field of the Invention

The invention relates to an electronic device, and more particularly to an electronic device having an ejection mechanism for ejecting an electronic element.

2. Description of the Related Art

A conventional portable electronic device (such as a notebook computer or tablet computer) typically has a wireless network access function, and antennas are disposed on the portable electronic device to receive wireless signals. Some antennas are fixedly mounted inside the housing of the portable electronic device, which easily causes the signals received by the antennas to be shielded by the housing, thereby affecting adversely the signal receiving effect of the antennas. In addition, some antennas are fixedly mounted on the outer surface of the housing of the portable electronic device directly. Although such an antenna mounting method does not affect the signal receiving effect of the antennas, it impairs the overall design of the appearance of the portable electronic device, and causes easily damage to the antennas due to collision or friction occurring when the portable electronic device is being carried.

SUMMARY OF THE INVENTION

Therefore, an object of the present invention is to provide an electronic device, including an ejection mechanism, which has a simple structure and is capable of retracting an electronic element (such as an antenna) into a casing, so as to result in convenience when the electronic device is carried, or ejecting the electronic element out of the casing, so as to clearly receive signals.

According to an aspect of this invention, an electronic device comprises a casing, an electronic element, and an ejection mechanism.

The casing is formed with a receiving space, and an opening and a through hole for communicating the receiving space with the outside. The ejection mechanism includes a holder, a first biasing spring, a stopping member, a second biasing spring, and a releasing member. The holder is slidably connected to the casing and is located within the receiving space. The holder is used for holding the electronic element, includes a projection, and is capable of carrying the electronic element to pass through the opening to be exposed outside the casing. The first biasing spring is disposed within the receiving space and biases the holder to project outwardly from the opening. The stopping member is rotatably connected to the casing and is located within the receiving space. The stopping member is located between the opening and the projection and is removably contactable with the projection. The second biasing spring is disposed within the receiving space and biases the stopping member to contact the projection. The second biasing spring has an elastic modulus greater than that of the first biasing spring. The releasing member extends through the through hole and is capable of carrying the stopping member to pivot relative to the casing to detach from the projection.

To achieve the objects of the present invention and solve the problems in the prior art, the following technical means may be adopted.

The stopping member includes a force-applying arm, a force-resisting arm located above the force-applying arm, and two pivot pins located between the force-applying arm and the force-resisting arm and pivoted to the casing. The second biasing spring biases the force-applying arm to allow the force-resisting arm to contact the projection.

The casing includes two support arms spaced apart from each other and extending vertically. The stopping member is disposed between the two support arms. Each of the support arms is formed with a pivot groove for receiving rotatably a corresponding one of the pivot pins.

The projection includes an engaging surface facing the opening and contactable with the force-resisting arm, and a first inclined surface opposite to the engaging surface. The force-resisting arm includes a second inclined surface contactable with the first inclined surface.

The holder further includes a pressing portion covering the opening, and is formed with a receiving groove for receiving the electronic element.

The casing further includes two first guiding rails spaced apart from each other. Each of the first guiding rails defines a first slide slot extending longitudinally. The holder further includes two sliding blocks slidably disposed within the first slide slots of the two first guiding rails, respectively. Each of the first guiding rails includes a first stop wall adjacent to the opening and contactable with and stopping a corresponding one of the sliding blocks when the corresponding one of the sliding blocks is moved toward the opening.

In one embodiment, the releasing member includes a pressing plate, and two pushing arms protruding from the pressing plate and slidably connected to the casing, and each of the pushing arms is used for pushing the force-applying arm to enable the force-resisting arm to detach from the projection. The casing further includes a retaining hook located between the through hole and the support arms. The force-applying arm includes an engaging hook extending toward and spaced apart from the retaining hook, and the second biasing spring is a tension spring having two ends hooked to the retaining hook and the engaging hook, respectively. The casing further includes two second guiding rails spaced apart from each other. Each of the second guiding rails defines a second slide slot extending longitudinally. Each of the pushing arms includes a sliding portion slidably disposed within the second slide slot. Each of the second guiding rails includes a second stop wall adjacent to the through hole and contactable with and stopping each of the sliding portions when the corresponding one of the sliding portions is moved toward the through hole.

In another embodiment, the releasing member is rotatably disposed within the through hole, and the releasing member includes a rotating portion exposed outside the through hole. One end of the releasing member opposite to the rotating portion is formed with a noncircular engaging hole. The stopping member further includes an engaging rod extending axially from one of the two pivot pins. The engaging rod is of a noncircular shape that matches the shape of the engaging hole. The engaging rod is engaged with the engaging hole. The second biasing spring is a torsion spring sleeved on one of the two pivot pins, and has a fixed end connected to one of the two support arms, and a pressing end pressing against one end of the force-applying arm distal from the opening. The casing further includes a stop block for stopping one end of the force-applying arm.

Another object of the present invention is to provide an ejection mechanism for an electronic device, which has a simple structure and is capable of retracting an electronic element into a casing, or ejecting the electronic element out of the casing.

According to another aspect of this invention, an ejection mechanism is disposed within a receiving space of a casing of an electronic device. The ejection mechanism is used for ejecting an electronic element out of the receiving space, and includes a holder, a first biasing spring, a stopping member, a second biasing spring, and a releasing member.

The holder is slidably connected to the casing and is located within the receiving space. The holder is used for holding the electronic element, includes a projection, and is capable of carrying the electronic element to be exposed outside the casing. The first biasing spring is disposed within the receiving space and biases the holder to project outwardly from the casing. The stopping member is rotatably connected to the casing, is located within the receiving space, and is removably contactable with the projection. The second biasing spring is disposed within the receiving space, biases the stopping member to contact the projection, and has an elastic modulus greater than that of the first biasing spring. The releasing member is disposed on the casing and is operable for driving the stopping member to pivot relative to the casing to detach from the projection.

The electronic device of the present invention is advantageous in that, through the design of the ejection mechanism, the electronic element can be received and concealed within the casing, or can be ejected out of the casing.

BRIEF DESCRIPTION OF THE DRAWINGS

Other features and advantages of the present invention will become apparent in the following detailed description of the preferred embodiments with reference to the accompanying drawings, of which:

FIG. 3 is an exploded perspective view the first embodiment of the electronic device according to the present invention, viewed from another viewing angle;

DETAILED DESCRIPTION OF THE PREFERRED EMBODIMENTS

Figure 1:
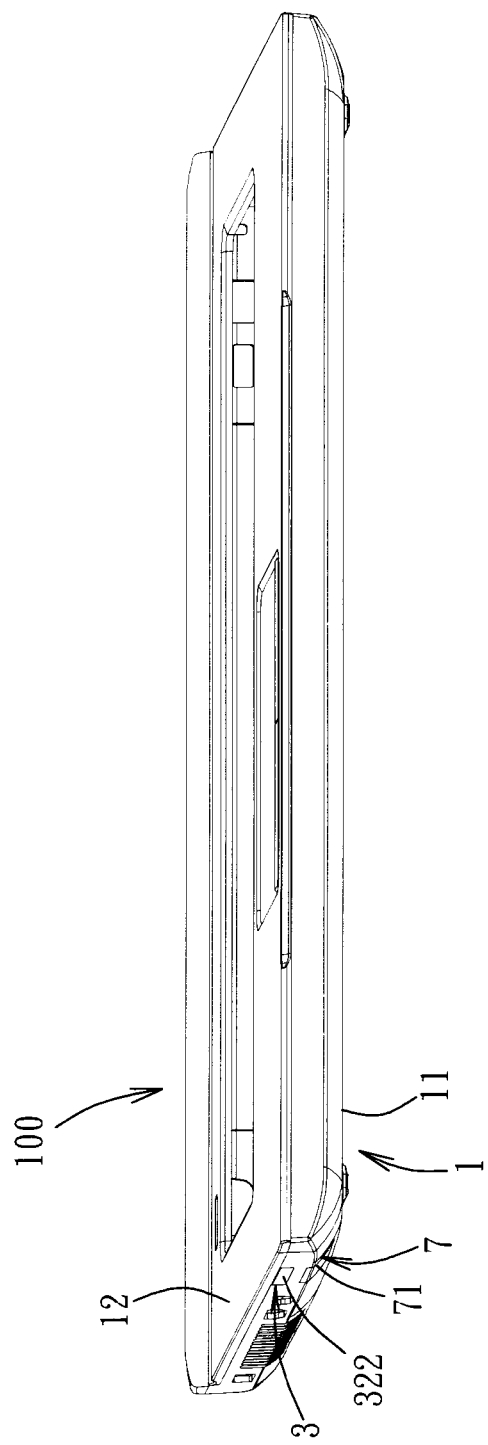
FIG. 1 is a perspective view of a first embodiment of an electronic device according to the present invention.

The above-mentioned and other technical contents, features, and effects of this invention will be clearly presented from the following detailed description of the two preferred embodiments in coordination with the reference drawings.

Before this invention is described in detail, it should be noted that, in the following description, similar elements are designated by the same reference numerals.

Figure 2:
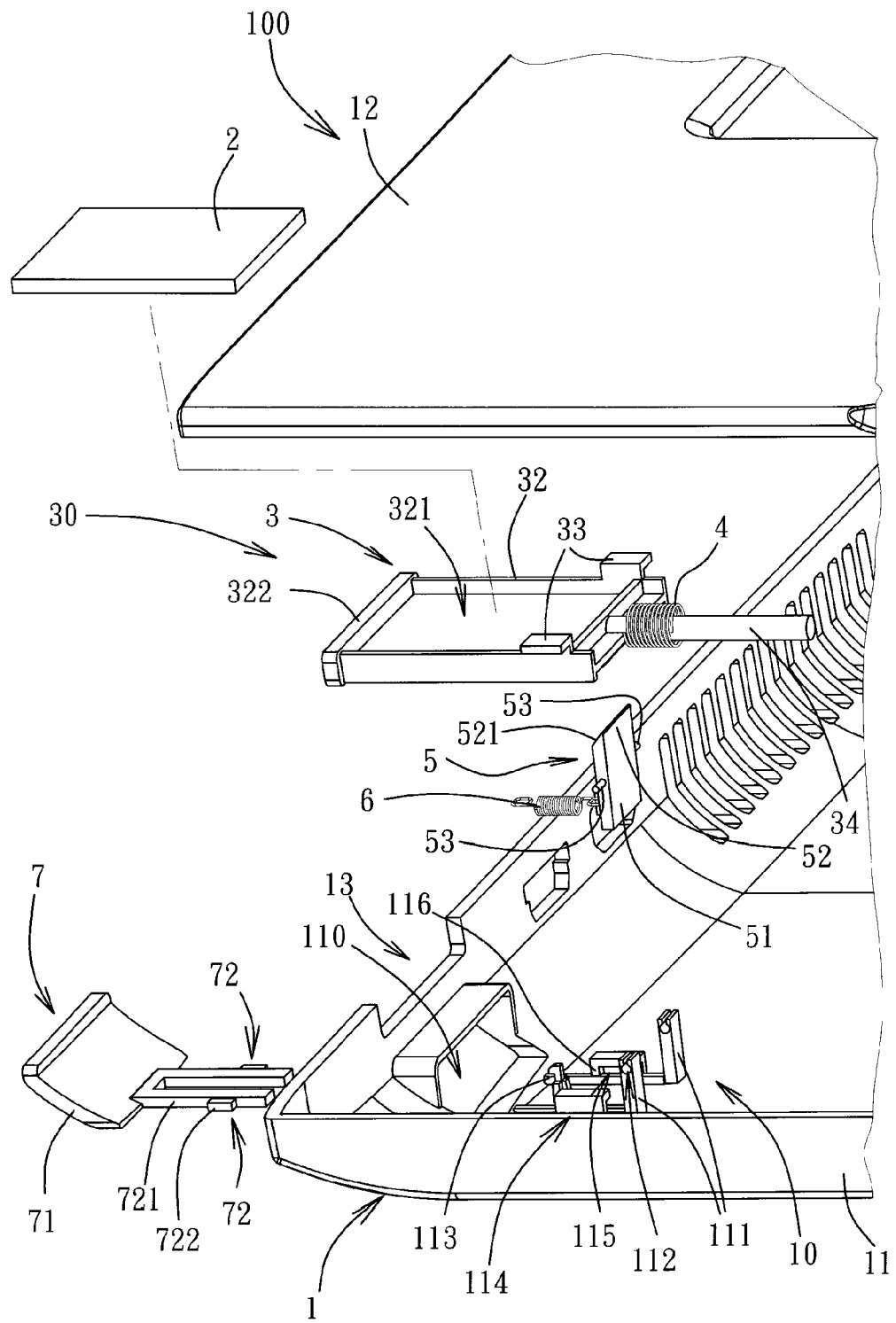
FIG. 2 is an exploded perspective view of the first embodiment of the electronic device according to the present invention.

As shown in FIGS. 1 and 2, a first embodiment of an electronic device 100 of the present invention is exemplified using a notebook computer. Alternatively, the electronic device 100 may be a tablet computer, a mobile phone, a personal digital assistant or the like. In this embodiment, the electronic device 100 comprises a casing 1, an electronic element 2, and an ejection mechanism 30. The casing 1 is exemplified using a host casing, which may be installed therewith, for example, a mother board, a hard disk, and an optical disk drive (not shown). A rear end of the casing 1 is rotatably connected to a display screen (not shown). The electronic element 2 of this embodiment is exemplified using an antenna. Alternatively, the electronic element 2 may be a receptacle electrical connector for inserting an electronic card (such as an SD card) therein.

Figure 4:
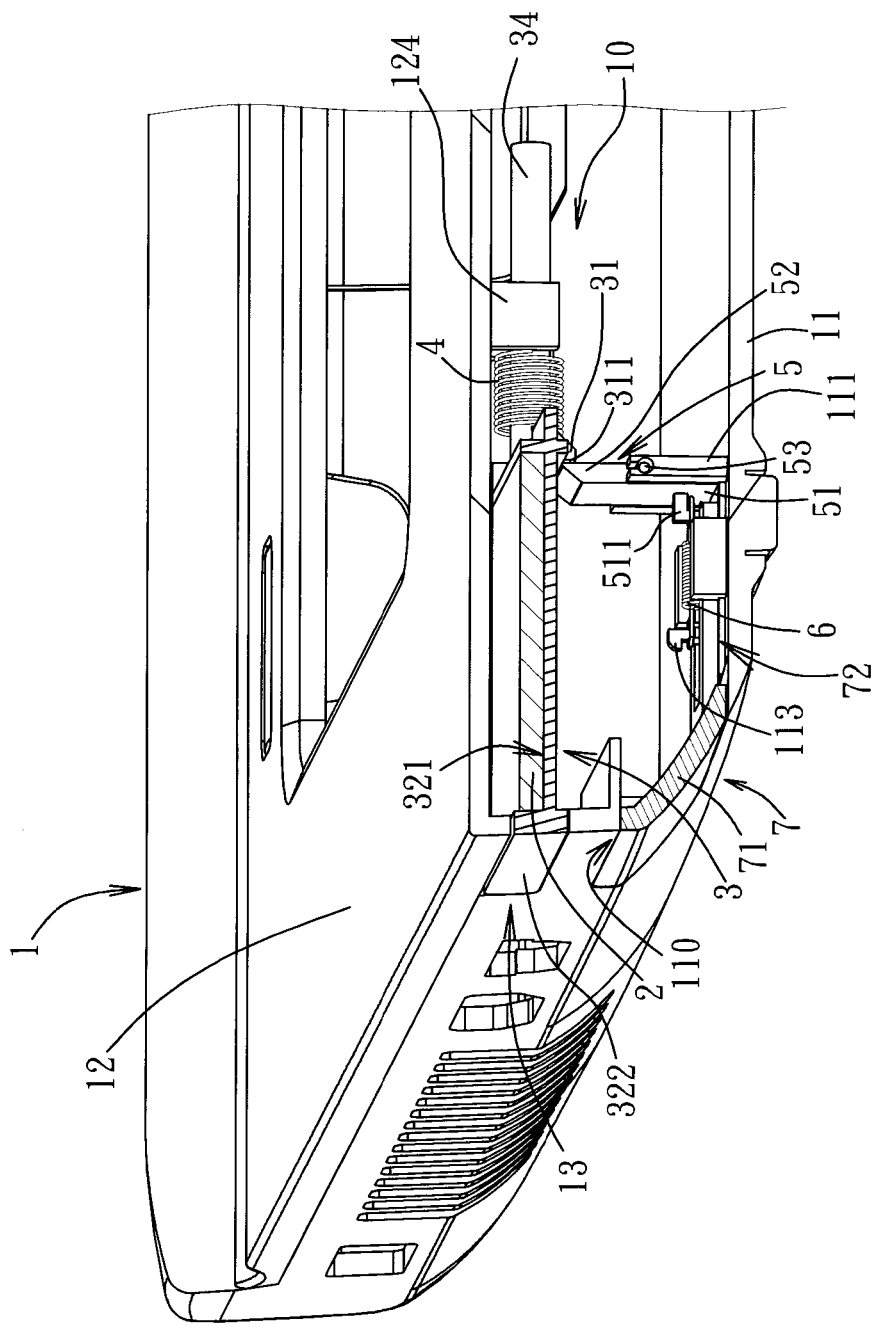
FIG. 4 is a fragmentary, partly sectional perspective view of the first embodiment of the electronic device according to the present invention, illustrating that an electronic element is received in a receiving space.

As shown in FIGS. 2, 3 and 4, the casing 1 is formed with a receiving space 10, and the ejection mechanism 30 is disposed within the receiving space 10 and is used for ejecting the electronic element 2 out of the receiving space 10. The ejection mechanism 30 includes a holder 3, a first biasing spring 4, a stopping member 5, a second biasing spring 6, and a releasing member 7. The holder 3 is slidably connected to the casing 1 and is located within the receiving space 10. The holder 3 is used for holding the electronic element 2, includes a projection 31, and is capable of carrying the electronic element 2 to be exposed outside the casing 1. The first biasing spring 4 is disposed within the receiving space 10 and biases the holder 3 to project outwardly from the casing 1. The stopping member 5 is rotatably connected to the casing 1, is located within the receiving space 10, and is removably contactable with the projection 31. The second biasing spring 6 is disposed within the receiving space 10 and biases the stopping member 5 to contact the projection 31. The second biasing spring 6 has an elastic modulus greater than that of the first biasing spring 4. Therefore, the stopping member 5 can be stably maintained at an engagement position to contact the projection 31, so that the electronic element 2 is positioned within the receiving space 10.

The releasing member 7 is disposed on the casing 1 and is operable for driving the stopping member 5 to pivot relative to the casing 1 to detach from the projection 31. When the stopping member 5 detaches from the projection 31, the first biasing spring 4 biases the holder 3 to project outwardly from the casing 1, and the holder 31 ejects the electronic element 2 out of the casing 1, so that the electronic element 2 is exposed outside the casing 1. At this time, the electronic element 2 is not shielded by the casing 1, so that the quality of receiving signals is not affected.

The structure and operation of the electronic device 100 will be described in detail below.

As shown in FIGS. 2, 3 and 4, in this embodiment, the casing 1 includes a lower housing 11, and an upper housing 12 detachably assembled to a top end of the lower housing 11. The lower housing 11 and the upper housing 12 cooperate to define the receiving space 10, and an opening 13 for communicating the receiving space 10 with the outside. The holder 3 is capable of carrying the electronic element 2 to pass through the opening 13 to be exposed outside the casing 1. The lower housing 11 is formed with a through hole 110 located under and spaced apart from the opening 13 to communicate the receiving space 10 with the outside. The releasing member 7 extends into the receiving space 10 through the through hole 110.

The upper housing 12 of the casing 1 includes two first guiding rails 121 protruding from an inner surface thereof and spaced apart from each other in a front-to-rear direction. Each of the first guiding rails 121 defines a first slide slot 122 extending longitudinally. The holder 3 includes a tray 32 formed at a top end of the projection 31, and two sliding blocks 33 protruding from front and rear ends of the tray 32, respectively. The tray 32 is formed with a receiving groove 321 for receiving the electronic element 2. The electronic element 2 may be fixed within the receiving groove 321 by an adhesive or a tongue-and-groove engagement. Each of the first slide slots 122 of the first guiding rails 121 has an open side for insertion of the corresponding sliding block 33 thereinto, so that the sliding blocks 33 are slidably connected within the first slide slots 122, respectively. As such, the holder 3 can carry the electronic element 2 to slide along the first slide slots 122 to project outwardly from the opening 13. Each of the first guiding rails 121 comprises a first stop wall 123, which is adjacent to the opening 13 and which is used for stopping the corresponding sliding block 33 of the holder 3 during leftward sliding movement of the corresponding sliding block 33 along the first guiding rail 121, so as to limit the slide stroke of the holder 3, thereby preventing removal of the holder 3 from the casing 1 through the opening 13.

The holder 3 further includes a projecting rod 34 protruding from a right end of the tray 32 and extending between two projecting plates 124 on the inner surface of the upper housing 12. The first biasing spring 4 is a compression spring sleeved on the projecting rod 34 and having two ends abutting against the tray 32 and an assembly of the projecting plates 124, respectively, for biasing the holder 3 to project outwardly from (i.e., move leftwardly relative to) the opening 13, so as to eject the tray 32 of the holder 3 out of the opening 13.

Figure 5:
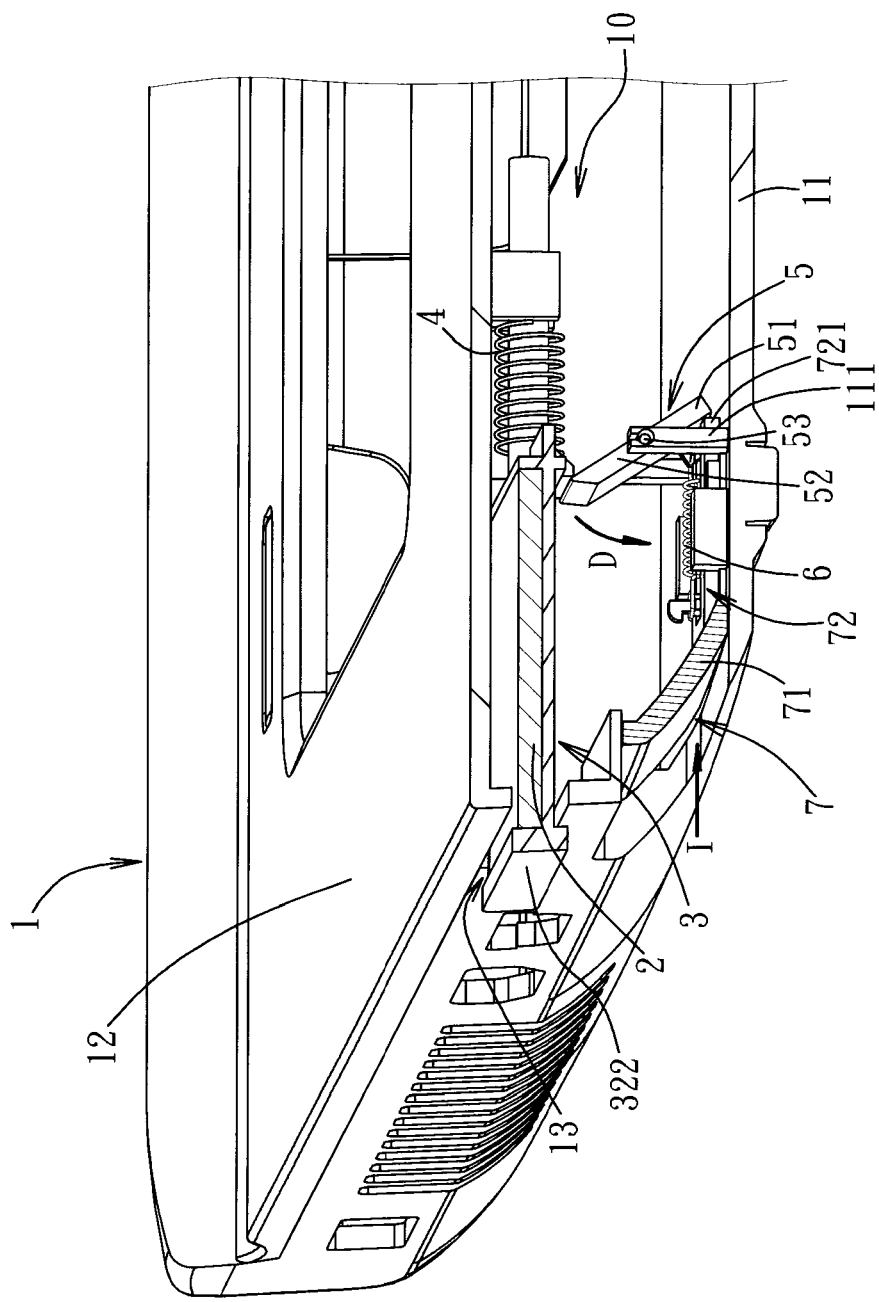
FIG. 5 is a fragmentary, partly sectional perspective view of the first embodiment of the electronic device according to the present invention, illustrating that the electronic element is moved outwardly.

The stopping member 5 has a plate structure and comprises a force-applying arm 51, a force-resisting arm 52 located above the force-applying arm 51, and two pivot pins 53 located between the force-applying arm 51 and the force-resisting arm 52 and pivoted to the lower housing 11 of the casing 1. The stopping member 5 may rotate about the pivot pins 53 relative to the lower housing 11, so that the force-resisting arm 52 comes into contact with an engaging surface 311 of the projection 31 of the holder 3 facing the opening 13. In this embodiment, the lower housing 11 of the casing 1 includes two support arms 111 protruding from an inner surface thereof and spaced apart from each other in the front-to-rear direction. Each of the support arms 111 extends vertically and is formed with a pivot groove 112, top, front and rear ends of which are open. The stopping member 5 is disposed between the two support arms 111. The two pivot pins 53 of the stopping member 5 are spaced apart from each other in the front-to-rear direction, and are rotatably disposed within the pivot grooves 112 of the support arms 111 respectively. The stopping member 5 is capable of rotating about the pivot pins 53 in a releasing direction D (as shown in FIG. 5) relative to the support arms 111, so as to enable the force-resisting arm 52 to detach from the engaging surface 311 of the projection 31.

The second biasing spring 6 is a tension spring having two ends hooked to the lower housing 11 of the casing 1 and the force-applying arm 51 of the stopping member 5, and has an elastic modulus greater than that of the first biasing spring 4. The stopping member 5 can be stably maintained at an engagement position where the force-resisting arm 52 is in contact with the engaging surface 311 of the projection 31. In this embodiment, the lower housing 11 of the casing 1 further includes a retaining hook 113 protruding from the inner surface thereof and located between the through hole 110 and the support arms 111. The force-applying arm 51 of the stopping member 5 includes an engaging hook 511 extending toward and spaced apart from the retaining hook 113. The two ends of the second biasing spring 6 are hooked to the retaining hook 113 and the engaging hook 511, respectively.

The releasing member 7 comprises a pressing plate 71 covering the through hole 110, and two pushing arms 72 protruding from an inner surface of the pressing plate 71 and slidably connected to the lower housing 11 of the casing 1. Each of the pushing arms 72 is used for pushing the force-applying arm 51 of the stopping member 5. The user may press the pressing plate 71 to enable the pushing arms 72 to push the force-applying arm 51 of the stopping member 5, so that the force-resisting arm 52 of the stopping member 5 can rotate along the releasing direction D to detach from the projection 31, so as to release the holder 3 from the stopping member 5. The lower housing 11 of the casing 1 further includes two second guiding rails 114 protruding from the inner surface thereof and spaced apart from each other in the front-to-rear direction. Each of the second guiding rails 114 defines a second slide slot 115 extending longitudinally. One end of the second slide slot 115 has an open right end. Each of the pushing arms 72 includes a pushing arm portion 721, and a sliding portion 722 protruding outwardly of the pushing arm portion 721. The sliding portion 722 is capable of being inserted into the second slide slots 115 of the second guiding rails 114 through the rights end of the second slide slots 115. As such, the releasing member 7 can slide in a left-to-right direction to push the force-applying arm 51 of the stopping member 5. Each of the second guiding rails 114 comprises a second stop wall 116 adjacent to the through hole 110. During leftward sliding movement of the releasing member 7 along the second slide slots 115, the second stop walls 116 are used for stopping the sliding portions 722 of the pushing arms 72, so as to limit the slide stroke of the releasing member 7, thereby preventing removal of the releasing member 7 from the casing 1 through the through hole 110.

As shown in FIG. 4, since the second biasing spring 6 has an elastic modulus greater than that of the first biasing spring 4, the stopping member 5 can be stably maintained at the engagement position where the force-resisting arm 52 is in contact with the engaging surface 311 of the projection 31, so that the electronic element 2 is positioned within the receiving space 10.

Figure 6:
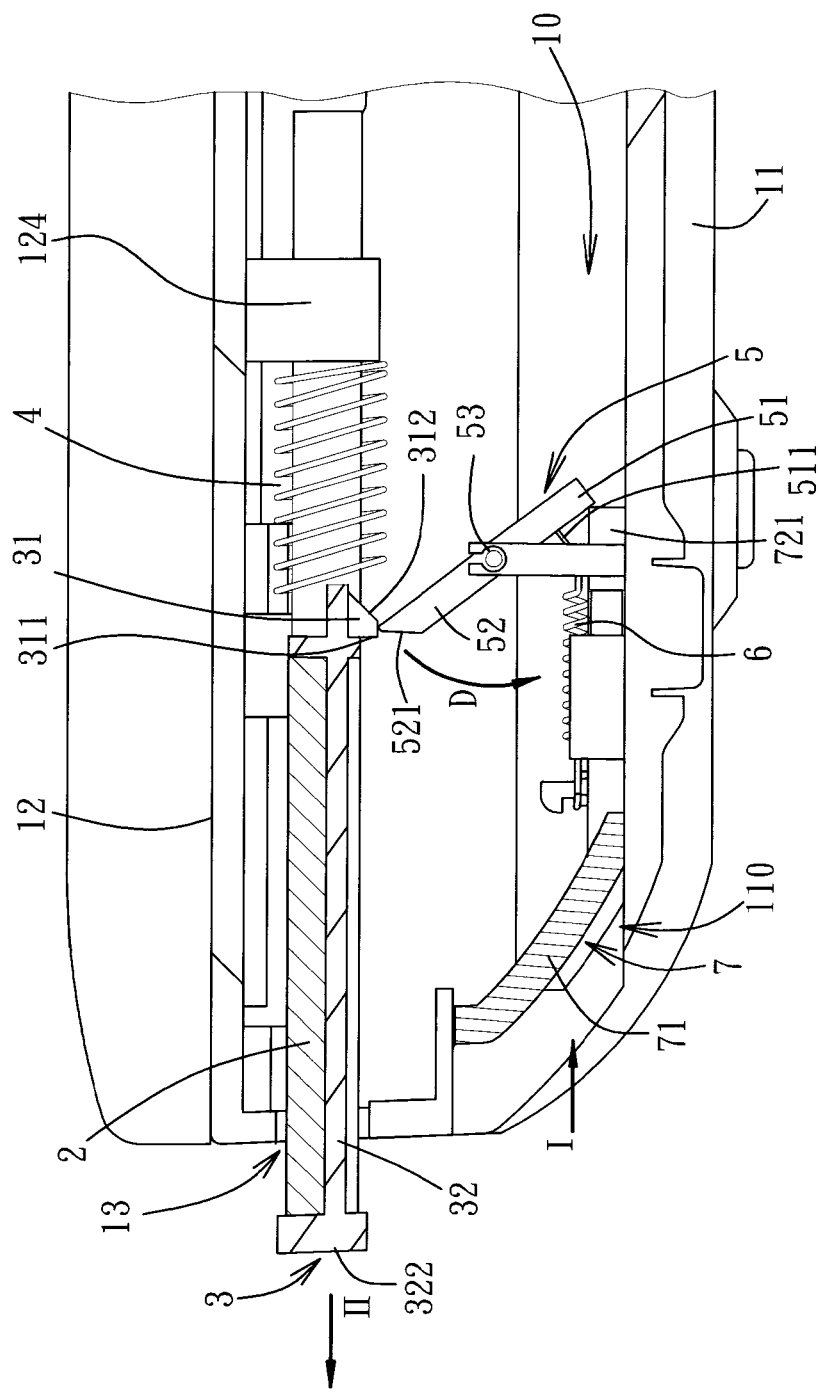
FIG. 6 is a fragmentary sectional view of the first embodiment of the electronic device according to the present invention, illustrating that the electronic element is moved outwardly.
Figure 7:
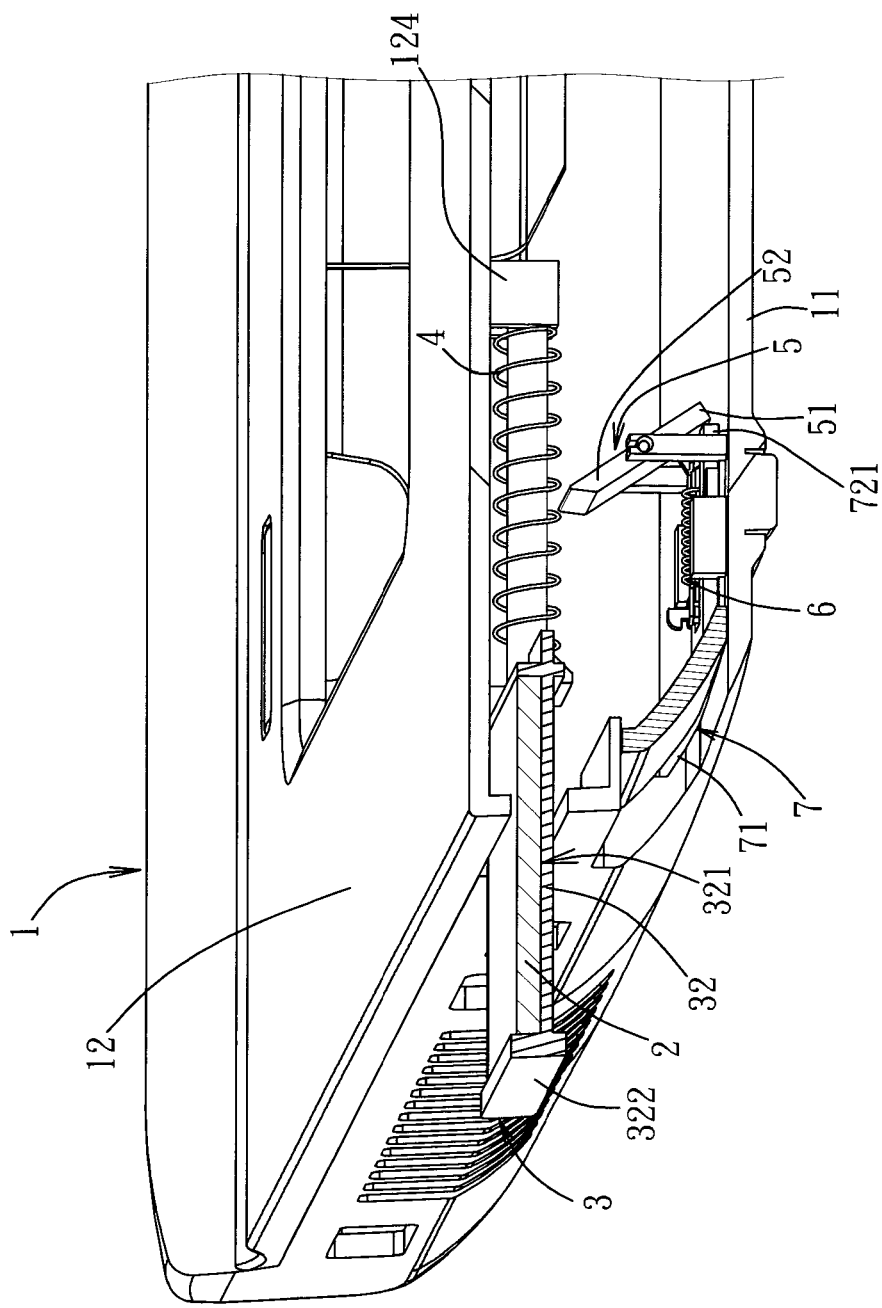
FIG. 7 is a fragmentary, partly sectional perspective view of the first embodiment of the electronic device according to the present invention, illustrating that the electronic element is exposed outside a casing.

As shown in FIGS. 5, 6 and 7, when it is intended to eject the electronic element 2 out of the opening 13, the user needs to apply a force in a direction indicated by Arrow I to press the pressing plate 71 of the releasing member 7, so as to enable the releasing member 7 to slide rightwardly along the second slide slots 115 (as shown in FIG. 2). When the pushing arm portions 721 of the pushing arms 72 contact and push the force-applying arm 51 of the stopping member 5, the stopping member 5 rotates about the pivot pins 53 in the releasing direction D relative to the support arms 111, so as to enable the force-resisting arm 52 to gradually detach from the engaging surface 311 of the projection 31. During rotation of the stopping member 5 in the releasing direction D, the engaging hook 511 of the force-applying arm 51 gradually stretches and resiliently deforms the second biasing spring 6, so that the second biasing spring 6 accumulates an elastic restoring force. Meanwhile, since the first biasing spring 4 biases the holder 3 to project outwardly from the opening 13, the holder 3 gradually slides outwardly within the opening 13 in a direction indicated by Arrow II, and the projection 31 pushes the force-resisting arm 52 of the stopping member 5 to rotate in the releasing direction D.

Figure 8:
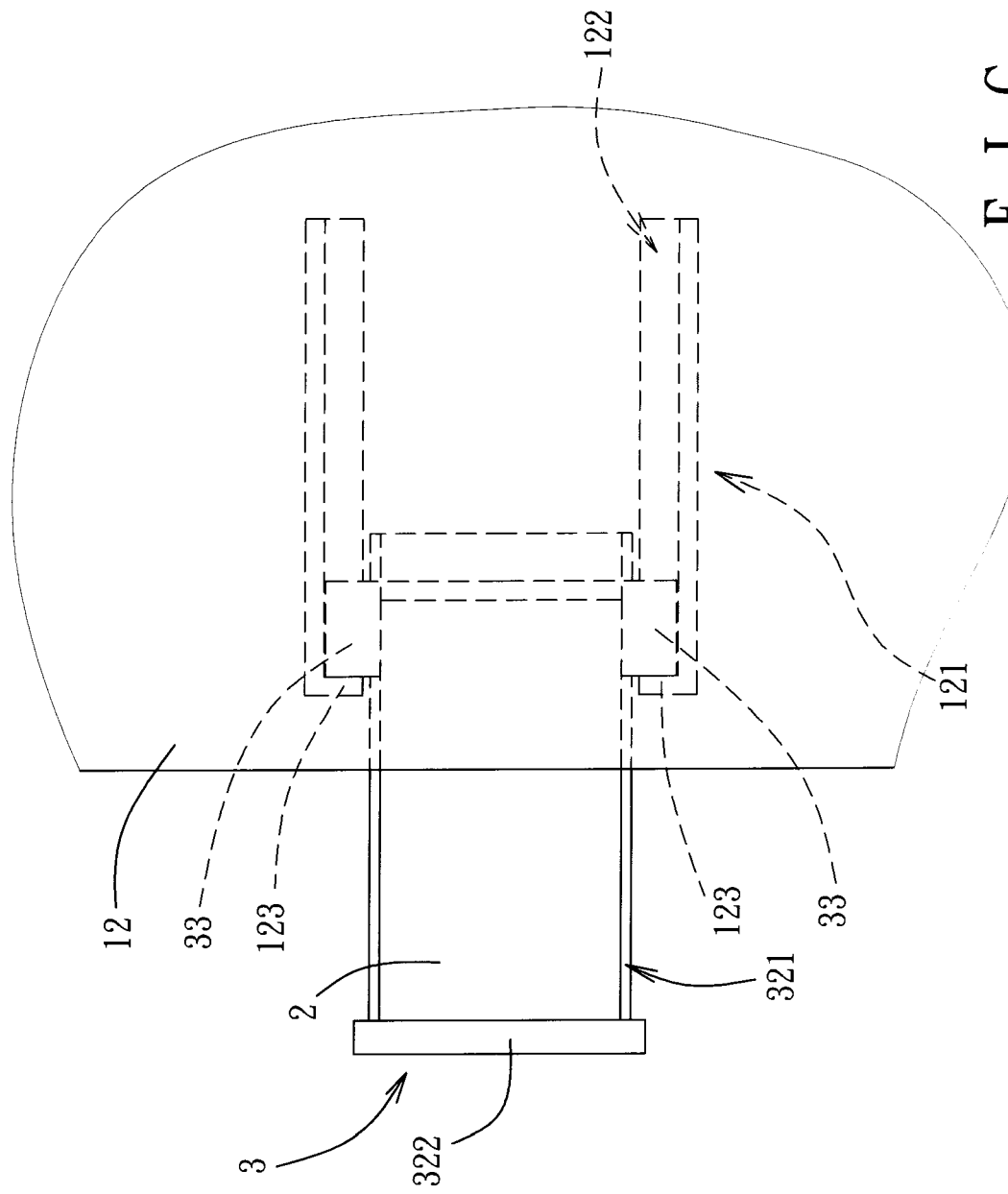
FIG. 8 is a fragmentary schematic view of the first embodiment of the electronic device according to the present invention, illustrating that two first stop walls stop two sliding blocks of a holder from rightward movement.
Figure 9:
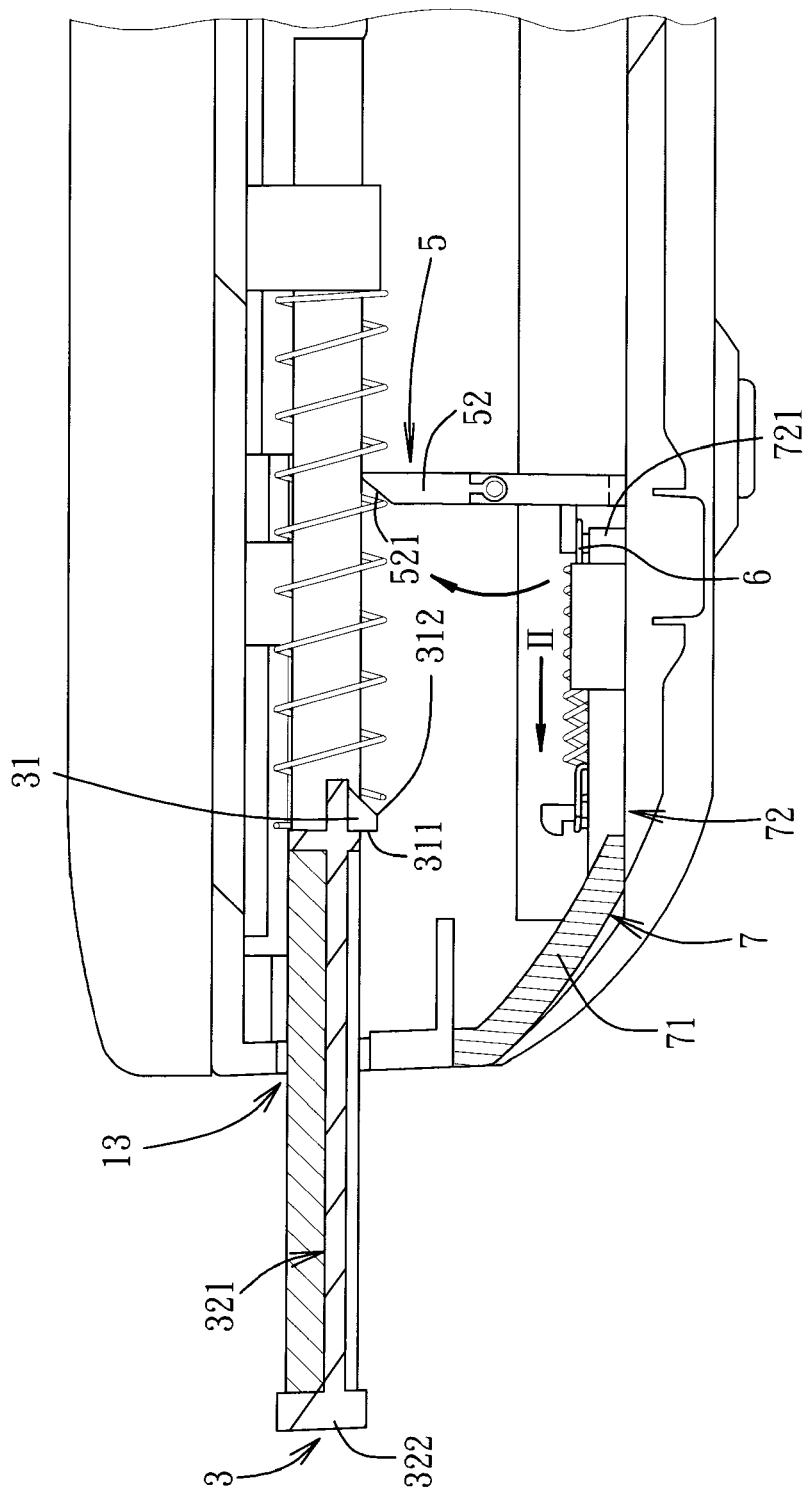
FIG. 9 is a fragmentary partly sectional view of the first embodiment of the electronic device according to the present invention, illustrating that the electronic element is partly exposed outside the casing.

When the stopping member 5 rotates to detach the force-resisting arm 52 completely from the engaging surface 311 of the projection 31, the first biasing spring 4 biases the holder 3 to project outwardly from the opening 13, so that the tray 32 of the holder 3 is ejected out of the opening 13. Once the holder 3 slides to a position where the sliding block 33 comes into contact with the first stop wall 123 of the first guiding rail 121 (as shown in FIG. 8), the holder 3 cannot continue to slide outwardly, and the electronic element 2 is exposed outside the casing 1. At this time, the electronic element 2 is not shielded by the casing 1, so that the quality of receiving signals is not affected. Then, the pressing plate 71 of the releasing member 7 is released, so that the force-applying arm 51 of the stopping member 5 is pulled by virtue of the resilient restoring force accumulated by the second biasing spring 6. Hence, the stopping member 5 rotates in a direction opposite to the releasing direction D and returns to a position shown in FIG. 9. During rotation of the stopping member 5 to the position shown in FIG. 9, the force-applying arm 51 pushes the pushing arms 72 of the releasing member 7 to move outwardly (i.e., left-wardly) in the direction indicated by Arrow II. Once the sliding portions 722 of the pushing arms 72 come into contact with the second stop walls 116 of the second guiding rails 114 (as shown in FIG. 2), the releasing member 7 cannot continue to slide outwardly, and the releasing member 7 returns to its original position as shown in FIG. 9.

As shown in FIG. 6, when it is intended to retract the electronic element 2 into the receiving space 10, the user needs to apply a force in the direction indicated by Arrow I to press the pressing plate 71 of the releasing member 7, so that the releasing member 7 slides rightwardly and the pushing arm portions 721 of the pushing arms 72 contact and push the force-applying arm 51 of the stopping member 5 to rotate the stopping member 5 in the releasing direction D, thereby preventing the force-resisting arm 52 of the stopping member 5 from obstructing rightward movement of the projection 31 of the holder 3. When rotating in the releasing direction D, the stopping member 5 stretches and resiliently deforms the second biasing spring 6, so that the second biasing spring 6 accumulates the resilient restoring force.

Then, a force is applied in the direction indicated by Arrow I to press a pressing portion 322 of the tray 32 of the holder 3, so as to enable the holder 3 to slide rightwardly. If the stopping member 5 rotates in the releasing direction D at such a large angle that a top end of the force-resisting arm 52 does not block the slide path of the projection 31, the projection 31 does not contact the force-resisting arm 52 and can smoothly pass past the top end of the force-resisting arm 52 when the holder 3 slides rightwardly. If the stopping member 5 rotates in the releasing direction D at such a small angle that the top end of the force-resisting arm 52 blocks the slide path of the projection 31, through contact between a first inclined surface 312 of the projection 31 located opposite to the engaging surface 311 and a second inclined surface 521 of the force-resisting arm 52 facing the opening 13, an upward force applied by the second inclined surface 521 to the projection 31 drives slightly upward movement of the projection 31, so that the projection 31 can smoothly pass past the top end of the force-resisting arm 52. Through the design of the first inclined surface 312 of the projection 31 and the second inclined surface 521 of the force-resisting arm 52, the projection 31 can smoothly pass past the top end of the force-resisting arm 52 even when the stopping member 5 rotates in the releasing direction D at a small angle, thereby improving the convenience in use and operation.

Figure 10:
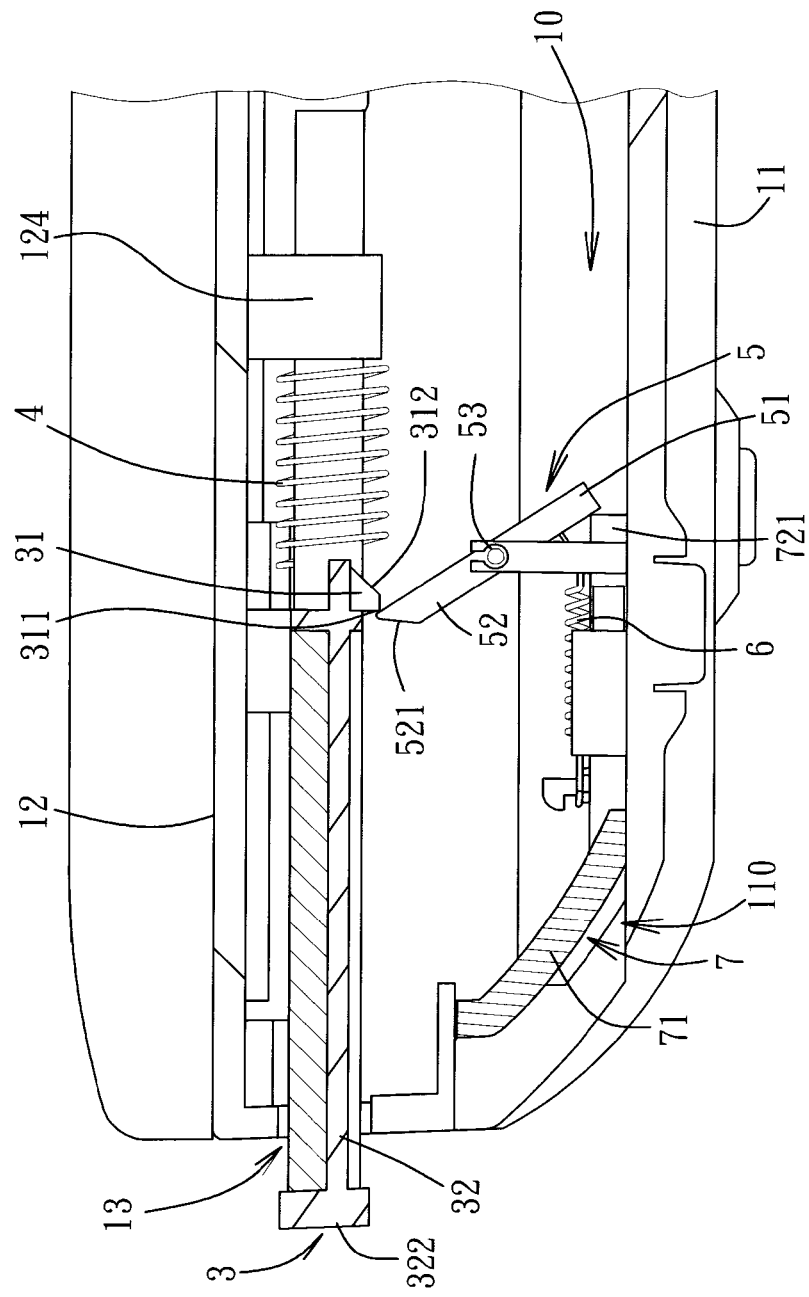
FIG. 10 is a fragmentary partly sectional view of the first embodiment of the electronic device according to the present invention, illustrating how a projection passes past a stopping member.

As shown in FIGS. 4 and 10, when the holder 3 slides rightwardly to a position where the pressing portion 322 covers the opening 13, the user can release the pressing plate 71 of the releasing member 7, so that the force-applying arm 51 of the stopping member 5 is pulled by the resilient restoring force accumulated by the second biasing spring 6. Hence, the stopping member 5 rotates in the direction opposite to the releasing direction D and returns to the engagement position shown in FIG. 4, and thus, the electronic element 2 is positioned within the receiving space 10. During rotation of the stopping member 5 to the engagement position, the force-applying arm 51 pushes the pushing arms 72 of the releasing member 7 outwardly in the direction indicated by Arrow II (as shown in FIG. 9), so that the releasing member 7 returns to its original position.

Figure 11:
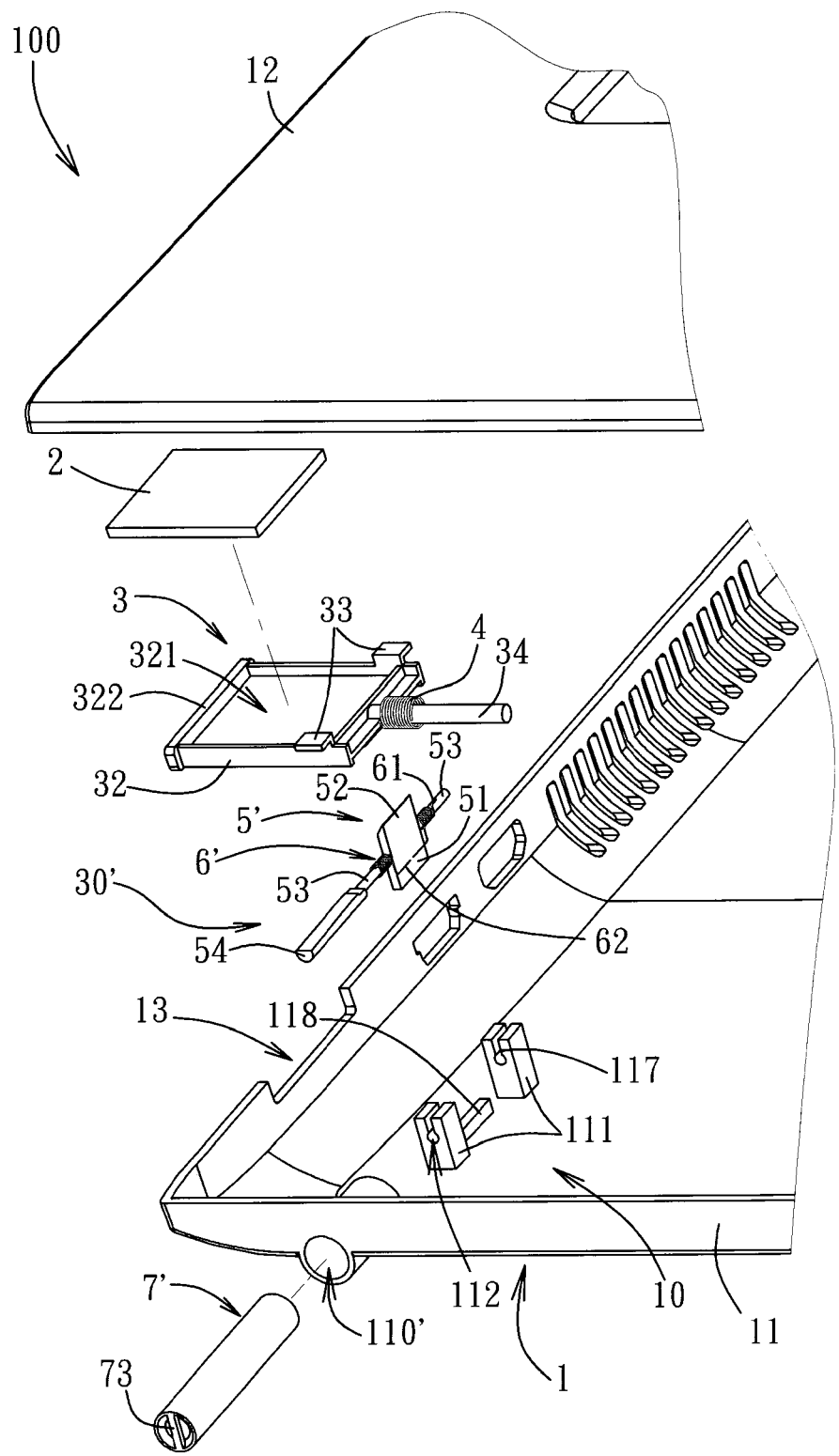
FIG. 11 is a fragmentary exploded perspective view of a second embodiment of the electronic device according to the present invention.
Figure 12:
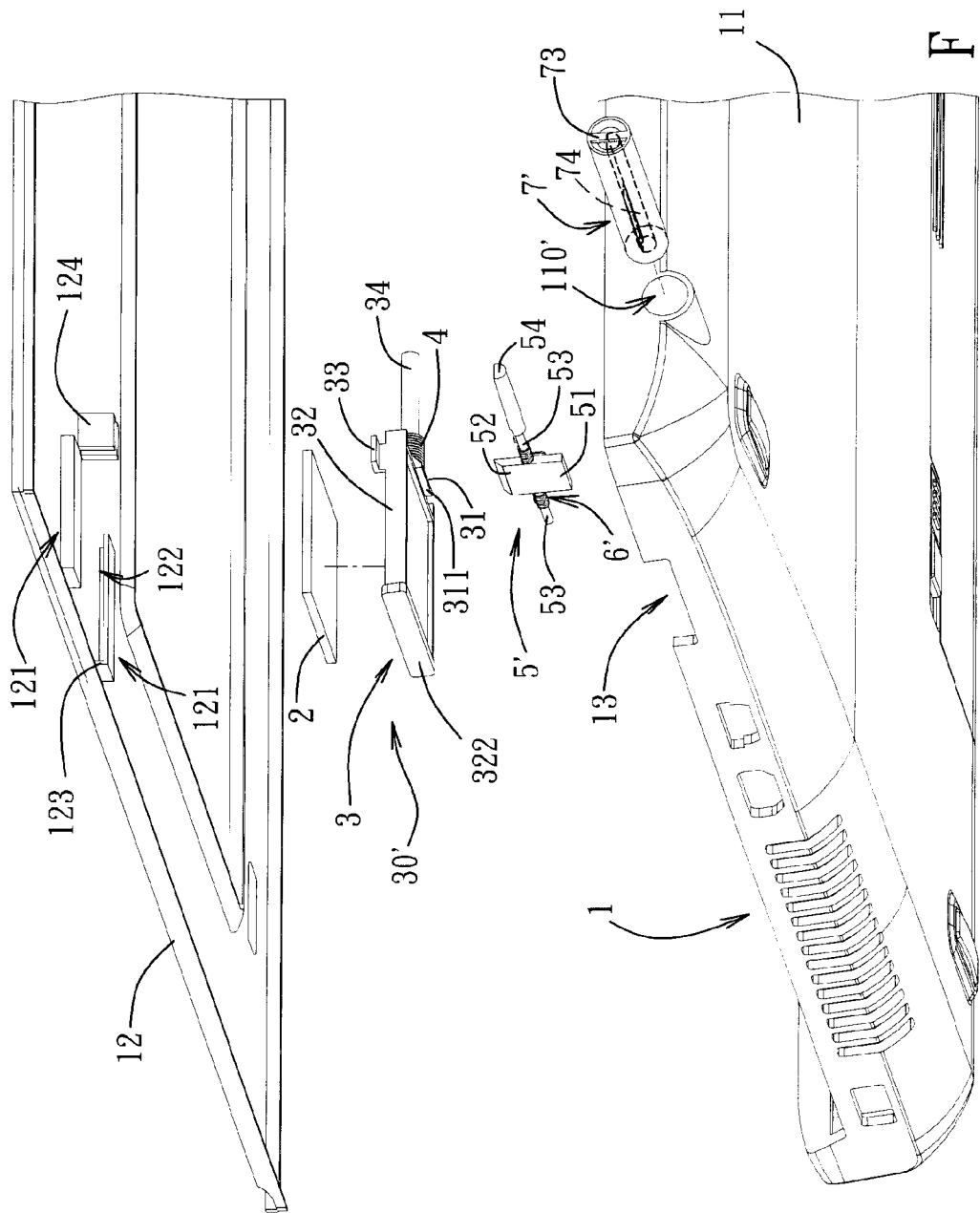
FIG. 12 is an exploded perspective view the second embodiment of the electronic device according to the present invention, viewed from another viewing angle.

FIGS. 11 and 12 show a second embodiment of the electronic device according to the present invention, in which the overall structure of the electronic device 100 is approximately the same as the first embodiment, except that the design of the ejection mechanism 30' is slightly different.

Figure 13:
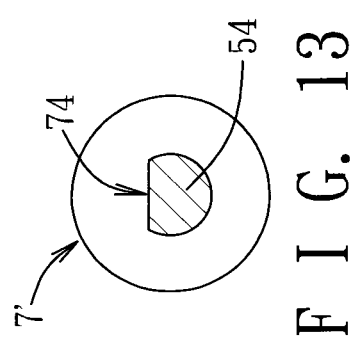
FIG. 13 is a side view of a releasing member of the second embodiment of the electronic device according to the present invention, illustrating that an engaging rod of a stopping member is engaged in an engaging hole of a releasing member.

As shown in FIGS. 11, 12 and 13, in this embodiment, the through hole 110' is located spacedly in front of the support arms 111, and is circular. The releasing member 7' is cylindrical and is rotatably disposed within the through hole 110'. The releasing member 7' includes a rotating portion 73 exposed outside the through hole 110', and one end of the releasing member 7' opposite to the rotating portion 73 is formed with a noncircular engaging hole 74. The stopping member 5' further includes an engaging rod 54 extending axially from one of the two pivot pins 53, the engaging rod 54 is of a noncircular shape that matches the shape of the engaging hole 74, and is engaged with the engaging hole 74 (as shown in FIG. 13). As such, the user can rotate the rotating portion 73 of the releasing member 7' to drive the stopping member 5' to rotate relative to the support arms 111.

The second biasing spring 6' is a torsion spring sleeved on one of the two pivot pins 53 of the stopping member 5'. The torsion spring 6' has a fixed end 61 connected to one of the two support arms 111, and a pressing end 62 pressing against one end of the force-applying arm 51 of the stopping member 5' distal from the opening 13. The fixed end 61 is engaged within a mounting hole 117 of the support arm 111. In this embodiment, there are two second biasing springs 6' that are sleeved on the two pivot pins 53 of the stopping member 5', respectively.

Figure 15:
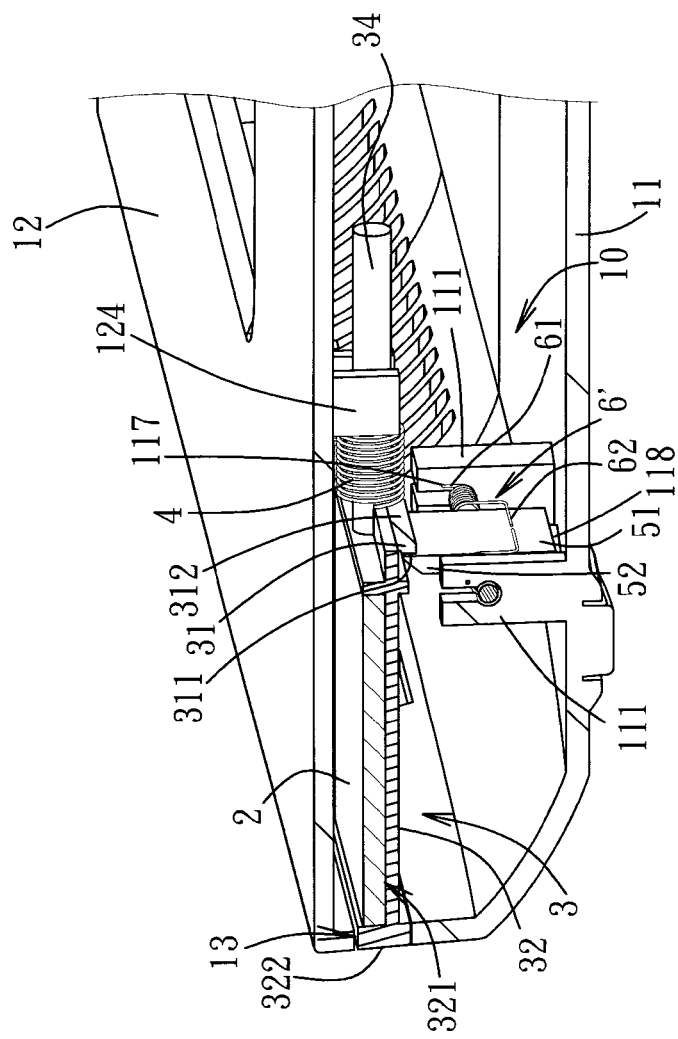
FIG. 15 is a fragmentary partly sectional view of the second embodiment of the electronic device according to the present invention, illustrating that an electronic element is received in the receiving space.
Figure 14:
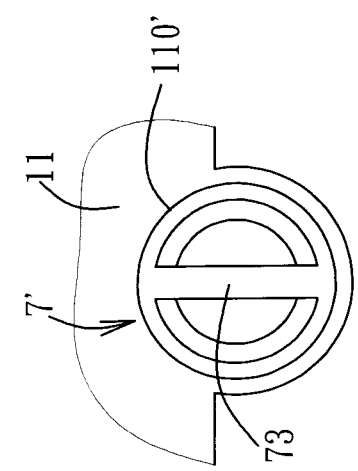
FIG. 14 is a fragmentary schematic view of the second embodiment of the electronic device according to the present invention, illustrating that the releasing member is rotatably disposed within a through hole of a casing.

As shown in FIGS. 14 and 15, since each of the second biasing springs 6' has an elastic modulus greater than that of the first biasing spring 4, the stopping member 5' can be stably maintained at the engagement position where the force-resisting arm 52 is in contact with the engaging surface 311 of the projection 31, so that the electronic element 2 is positioned within the receiving space 10.

Figure 17:
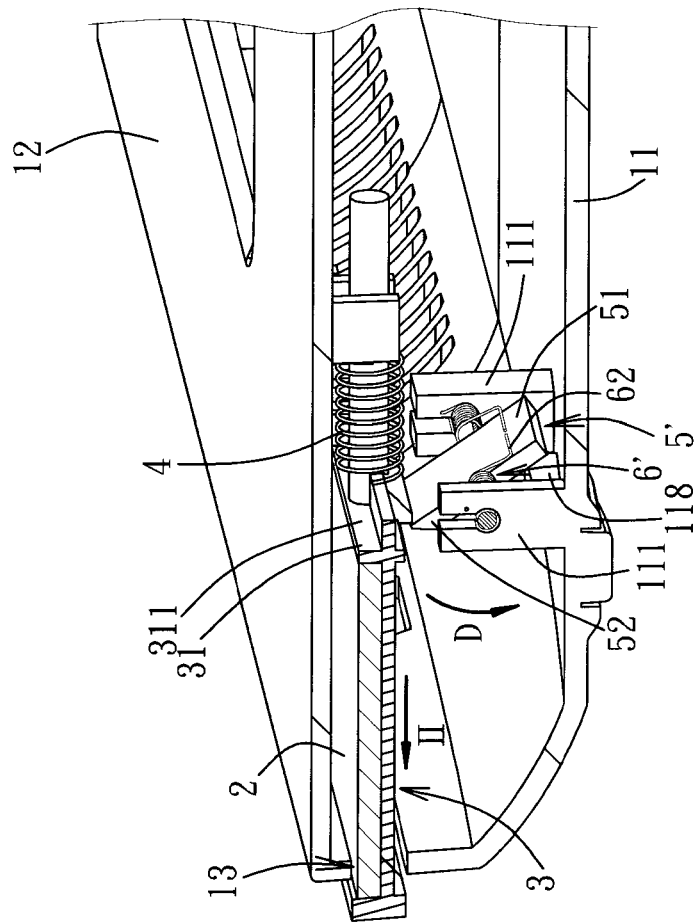
FIG. 17 is a fragmentary sectional view of the second embodiment of the electronic device according to the present invention.
Figure 16:
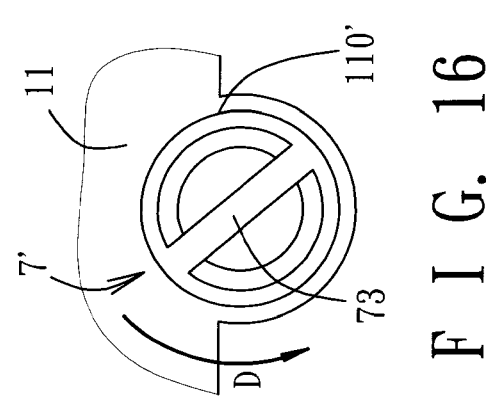
FIG. 16 is a fragmentary schematic view of the second embodiment of the electronic device according to the present invention, illustrating that the releasing member is rotated in a releasing direction.
Figure 18:
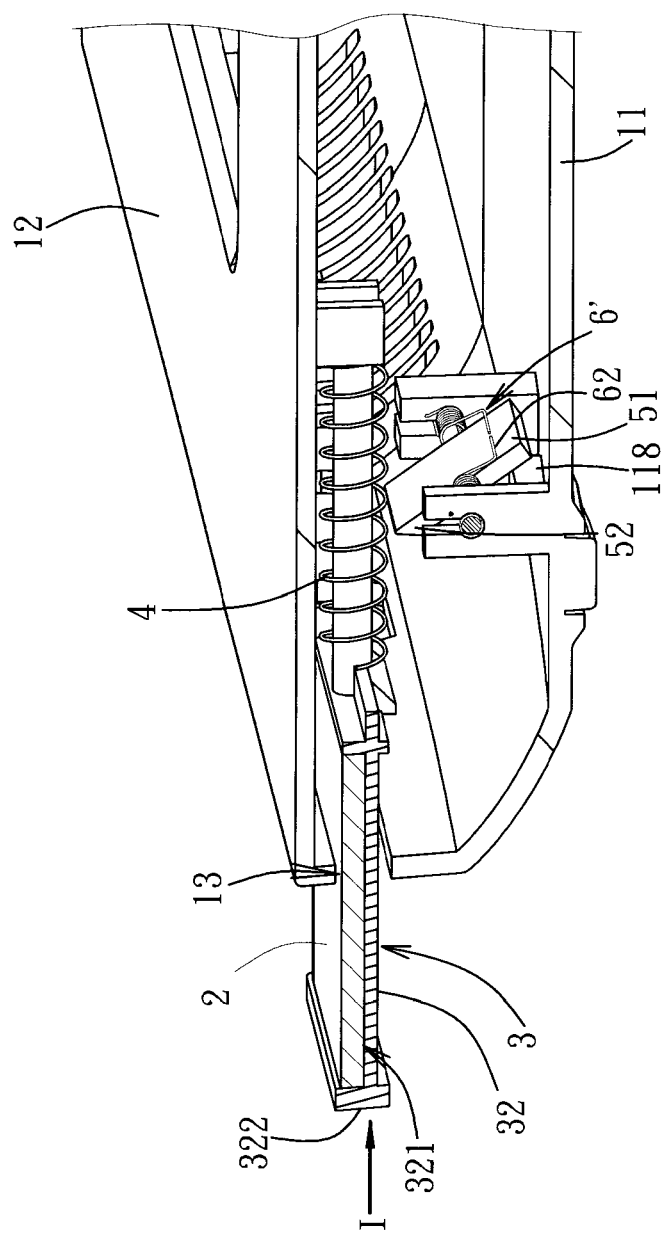
FIG. 18 is a fragmentary sectional view of the second embodiment of the electronic device according to the present invention, illustrating that the electronic element is exposed outside the casing.

As shown in FIGS. 16, 17 and 18, when it is intended to eject the electronic element 2 out of the opening 13, the user needs to apply a force in the releasing direction D to rotate the rotating portion 73 of the releasing member 7', so that the stopping member 5' rotates about the pivot pins 53 (as shown in FIG. 11) in the releasing direction D relative to the support arms 111, so as to enable the force-resisting arm 52 to gradually detach from the engaging surface 311 of the projection 31. During rotation of the stopping member 5' in the releasing direction D, the force-applying arm 51 also drives the pressing end 62 of the second biasing spring 6' to rotate, so that the second biasing spring 6' is resiliently deformed to accumulate the resilient restoring force. Meanwhile, since the first biasing spring 4 biases the holder 3 to project outwardly from the opening 13, the holder 3 gradually slides outwardly within the opening 13 in the direction indicated by Arrow II, and the projection 31 pushes the force-resisting arm 52 of the stopping member 5' to rotate in the releasing direction D.

When the stopping member 5' rotates to detach the force-resisting arm 52 completely from the engaging surface 311 of the projection 31, the first biasing spring 4 biases the holder 3 outwardly to move within the opening 13, so that the tray 32 of the holder 3 is ejected out of the opening 13, thereby allowing the electronic element 2 to be exposed outside the casing 1. Then, the rotating portion 73 of the releasing member 7' is released, so that the force-applying arm 51 of the stopping member 5' is pushed by virtue of the resilient restoring force accumulated by the second biasing spring 6'. Hence, the stopping member 5' rotates in the direction opposite to the releasing direction D. When one end of the force-applying arm 51 of the stopping member 5' comes into contact with a stop block 118 on the inner surface of the lower housing 11 of the casing 1, the stop block 118 stops rotation of the force-applying arm 51, so that the stopping member 5' cannot continue to rotate and thus returns to a position as shown in FIG. 15.

As shown in FIGS. 16 and 18, when it is intended to retract the electronic element 2 into the receiving space 10, the user needs to apply a force in the releasing direction D to rotate the rotating portion 73 of the releasing member 7', so as to drive the stopping member 5 to rotate in the releasing direction D, thereby preventing the force-resisting arm 52 of the stopping member 5' from blocking the slide path of the projection 31 of the holder 3. Then, a force is applied in the direction indicated by Arrow I to press the pressing portion 322 of the holder 3, so that the holder 3 slides rightwardly to allow the projection 31 to pass past the top end of the force-resisting arm 52. When the holder 3 slides rightwardly to a position where the pressing portion 322 covers the opening 13, the user can release the rotating portion 73 of the releasing member 7', so that the force-applying arm 51 of the stopping member 5' is pushed by virtue of the resilient restoring force accumulated by the second biasing spring 6'. Hence, the stopping member 5' rotates in the direction opposite to the releasing direction D and returns to the engagement position shown in FIG. 15, and at this time, the electronic element 2 is positioned within the receiving space 10.

To sum up, in the electronic device 100 according to the present invention, due to the design that the second biasing spring 6, 6' of the ejection mechanism 30, 30' has an elastic modulus greater than that of the first biasing spring 4, the stopping member 5, 5' can be stably maintained at an engagement position where the force-resisting arm 52 is in contact with the engaging surface 311 of the projection 31, so that the electronic element 2 can be stably positioned within the receiving space 10. By manipulating the releasing member 7, 7' to drive the stopping member 5, 5' to rotate in the releasing direction D so as to enable the force-resisting arm 52 to detach from the engaging surface 311, the holder 3 can carry the electronic element 2 to pass through the opening 13 to thereby be exposed outside the casing 1. Thus, the objects of the present invention can surely be achieved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
a casing formed with a receiving space, an opening, and a through hole, said opening and said through hole being adapted for communicating said receiving space with the outside;
an electronic element; and
an ejection mechanism including
a holder slidably connected to said casing and located within said receiving space, said holder being used for holding said electronic element and including a projection, said holder being capable of carrying said electronic element to pass through said opening to be exposed outside said casing;
a first biasing spring disposed within said receiving space and biasing said holder to project outwardly from said opening;
a stopping member rotatably connected to said casing and located within said receiving space, said stopping member being located between said opening and said projection and being removably contactable with said projection;
a second biasing spring disposed within said receiving space and biasing said stopping member to contact said projection, said second biasing spring having an elastic modulus greater than that of said first biasing spring; and a releasing member extending through said through hole and operable for driving said stopping member to pivot relative to said casing to detach from said projection.

2. The electronic device of claim 1, wherein said stopping member includes a force-applying arm, a force-resisting arm located above said force-applying arm, and two pivot pins located between said force-applying arm and said force-resisting arm and pivoted to said casing, said force-applying arm being connected to and biased by said second biasing spring, said force-resisting arm being contactable with said projection.

3. The electronic device of claim 2, wherein said casing includes two support arms spaced apart from each other and extending vertically, said stopping member being disposed between said two support arms, each of said support arms being formed with a pivot groove for receiving rotatably a corresponding one of said pivot pins.

4. The electronic device of claim 3, wherein said projection includes an engaging surface facing said opening and contactable with said force-resisting arm, and a first inclined surface opposite to said engaging surface, and said force-resisting arm includes a second inclined surface contactable with said first inclined surface.

5. The electronic device of claim 4, wherein said holder further includes a pressing portion covering said opening, and is formed with a receiving groove for receiving said electronic element.

6. The electronic device of claim 5, wherein said casing further includes two first guiding rails spaced apart from each other, each of said first guiding rails defining a first slide slot extending longitudinally, said holder further including two sliding blocks slidably disposed within said first slide slots of said two first guiding rails, respectively, each of said first guiding rails including a first stop wall adjacent to said opening and contactable with and stopping a corresponding of said sliding blocks when the corresponding one of said sliding blocks is moved toward said opening.

7. The electronic device of claim 3, wherein said releasing member includes a pressing plate, and two pushing arms protruding from said pressing plate and slidably connected to said casing, each of said pushing arms being used for pushing said force-applying arm to enable said force-resisting arm to detach from said projection.

8. The electronic device of claim 7, wherein said casing further includes a retaining hook located between said through hole and said support arms, and said force-applying arm includes an engaging hook extending toward and spaced apart from said retaining hook, said second biasing spring being a tension spring having two ends hooked to said retaining hook and said engaging hook, respectively.

9. The electronic device of claim 8, wherein said casing further includes two second guiding rails spaced apart from each other, each of said second guiding rails defining a second slide slot extending longitudinally, each of said pushing arms including a sliding portion slidably disposed within a corresponding one of said second slide slots of said second guiding rails, each of said second guiding rails including a second stop wall adjacent to said through hole and contactable with and stopping a corresponding one of said sliding portions of said pushing arms when the corresponding one of said sliding portions is moved toward said through hole.

10. An ejection mechanism adapted to be disposed within a receiving space of a casing of an electronic device for ejecting an electronic element out of the receiving space, said ejection mechanism comprising:

a holder slidably adapted to be connected to the casing and located within said receiving space, said holder being adapted for holding the electronic element and including a projection, said holder being adapted to carry the electronic element to be exposed outside the casing;

a first biasing spring adapted to be disposed within the receiving space for biasing said holder to project outwardly from the casing;

a stopping member adapted to be rotatably connected to the casing and located within the receiving space, said stopping member being removably contactable with said projection;

a second biasing spring adapted to be disposed within the receiving space for biasing said stopping member to contact said projection, said second biasing spring having an elastic modulus greater than that of said first biasing spring; and a releasing member adapted to be disposed on said the casing and adapted to be operable for driving said stopping member to pivot relative to the casing to detach from said projection.

11. The ejection mechanism according to claim 10, wherein said stopping member includes a force-applying arm, a force-resisting arm located above said force-applying arm, and two pivot pins located between said force-applying arm and said force-resisting arm and adapted to be pivoted to the casing, said force-applying arm being connected to and biased by said second biasing spring, said force-resisting arm being contactable with said projection.

12. The ejection mechanism according to claim 11, wherein said projection includes an engaging surface contactable with said force-resisting arm, and a first inclined surface opposite to said engaging surface, and said force-resisting arm includes a second inclined surface contactable with said first inclined surface.

13. The ejection mechanism according to claim 12, wherein said holder further includes a pressing portion, and is formed with a receiving groove adapted for receiving the electronic element.

14. The ejection mechanism according to claim 12, wherein said releasing member includes a pressing plate, and two pushing arms protruding from said pressing plate and adapted to be slidably connected to the casing, each of said pushing arms being used for pushing said force-applying arm to enable said force-resisting arm to detach from said projection.

15. The ejection mechanism according to claim 14, wherein said second biasing spring is a tension spring having two ends adapted to be hooked to the casing and said force-applying arm, respectively.

* * * * *